(12) United States Patent
Quade et al.

(10) Patent No.: US 11,953,100 B2
(45) Date of Patent: Apr. 9, 2024

(54) VALVE APPARATUS (71) Applicant: ILLINOIS TOOL WORKS INC., Glenview, IL (US)

(72) Inventors: Peter Quade, Walsrode (DE); Torsten Hauk, Neustadt (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 48 days.

(21) Appl. No.: 17/489,024

(22) Filed: Sep. 29, 2021

(65) Prior Publication Data

US 2022/0107026 A1 Apr. 7, 2022

(30) Foreign Application Priority Data

Oct. 2, 2020 (DE) .................... 10 2020 125 870.4
Jun. 11, 2021 (DE) .................... 10 2021 115 132.5

(51) Int. Cl.
| | |
|---|---|
| *F16K 31/04* | (2006.01) |
| *F16K 1/54* | (2006.01) |
| *F16K 15/18* | (2006.01) |
| *F16K 31/524* | (2006.01) |
| *F16K 31/53* | (2006.01) |
| *F01P 7/14* | (2006.01) |

(52) U.S. Cl.
CPC .............. *F16K 1/54* (2013.01); *F16K 15/18* (2013.01); *F16K 31/041* (2013.01); *F16K 31/046* (2013.01); *F16K 31/5245* (2013.01); *F16K 31/53* (2013.01); *F01P 2007/146* (2013.01)

(58) Field of Classification Search
CPC ............. F01P 2007/146; F01P 2031/00; F16K 5/0347; F16K 5/08; F16K 11/0873; F16K 27/067; F16K 31/043; F16K 31/046; F16K 31/53; F16K 31/535; F16K 31/563; F16K 31/52466; F16K 37/0083
See application file for complete search history.

(56) References Cited

U.S. PATENT DOCUMENTS

| | | | | |
|---|---|---|---|---|
| 672,600 | A * | 4/1901 | Feldmann | ............ H01H 3/3031 |
| | | | | 74/2 |
| 684,436 | A * | 10/1901 | Kepler | .................... F16K 17/00 |
| | | | | 251/68 |
| 1,466,666 | A * | 9/1923 | Marshall | ............... B60R 25/042 |
| | | | | 251/177 |
| 4,090,589 | A * | 5/1978 | Fitzwater | .............. F16D 13/025 |
| | | | | 92/143 |
| 4,911,029 | A * | 3/1990 | Banba | ................... F16K 17/363 |
| | | | | 74/2 |

(Continued)

FOREIGN PATENT DOCUMENTS

DE 102017107688 A1 10/2018

*Primary Examiner* — Matthew W Jellett
(74) *Attorney, Agent, or Firm* — THOMPSON HINE LLP (57) ABSTRACT

A valve apparatus, in particular for a cooling system of a vehicle, includes a housing having at least two fluid connectors, a valve device which can be adjusted at least between a first valve position and a second valve position, and a drive for adjusting the valve device between the first valve position and the second valve position. The valve apparatus includes a fail-safe adjustment device in order to transfer the valve device from the first valve position into the second valve position in the event of an incident in which the power supply, in particular that of the vehicle, is interrupted.

17 Claims, 6 Drawing Sheets

(56) References Cited

U.S. PATENT DOCUMENTS

| | | | | |
|---|---|---|---|---|
| 5,205,252 | A * | 4/1993 | Krepela | F02D 17/04 |
| | | | | 123/198 DB |
| 6,095,488 | A * | 8/2000 | Semeyn, Jr. | F02D 11/10 |
| | | | | 251/69 |
| 6,336,469 | B1 * | 1/2002 | Nixon | F16K 31/563 |
| | | | | 122/504 |
| 6,622,984 | B2 * | 9/2003 | Rauch | F02D 11/10 |
| | | | | 251/71 |
| 7,182,310 | B2 * | 2/2007 | Chen | F16K 31/047 |
| | | | | 251/129.11 |
| 7,377,479 | B1 * | 5/2008 | Chen | F16K 31/047 |
| | | | | 251/249.5 |
| 7,451,777 | B2 * | 11/2008 | Burlage | F17D 5/06 |
| | | | | 137/460 |
| 7,963,455 | B2 * | 6/2011 | Heldberg | F16K 11/0873 |
| | | | | 236/93 R |
| 8,070,126 | B2 * | 12/2011 | Hauk | F16K 31/025 |
| | | | | 137/334 |
| 8,360,393 | B2 * | 1/2013 | Park | F16K 31/53 |
| | | | | 251/71 |
| 8,899,548 | B2 * | 12/2014 | Hauk | F16K 31/045 |
| | | | | 251/288 |
| 9,803,764 | B2 * | 10/2017 | Chang | F16K 31/524 |
| 11,555,376 | B2 * | 1/2023 | Inglis | E21B 34/103 |
| 2012/0298894 | A1 * | 11/2012 | Fuehrer | F16K 31/53 |
| | | | | 251/227 |

* cited by examiner

VALVE APPARATUS

TECHNICAL FIELD

The present invention relates to a valve apparatus, in particular for a cooling system of a vehicle.

BACKGROUND

A valve arrangement for a cooling system of a vehicle is disclosed in DE 10 2017 107 688 A1. Said arrangement comprises a housing having at least two coolant connectors, further comprising a valve element which is adjustable between an open position releasing an interface between the coolant connectors and a closed position separating the interface between the coolant connectors, and comprising a drive for adjusting the valve element between the open position and the closed position.

For smaller valves for the switching of auxiliary circuits in cooling systems of motor vehicles, simple and inexpensive electrically switchable valve arrangements are desirable. Due to the comparatively low flow rates in such auxiliary circuits, and in order to make the valve assemblies simple and inexpensive, poppet valves (also referred to as plunger or tappet valves) are often used in these applications.

Moving the poppet valves into the closed position occurs against the fluid pressure of coolant flowing through the cooling system. When the pressure difference leads to increased actuation forces via the nearly closed valve element, drives for driving the valve element must apply high forces in the closing area, i.e. shortly before and until the valve element closes, for a low distance and for a short time. Before reaching this closing area and also for opening the valve element, on the other hand, significantly lower forces are required.

In the prior art, electromagnetic drives with coils are used for such valve elements. Because the maximum available actuating force is predetermined by the magnet arrangement, it must be large in dimension in order to be able to realize the relatively high maximum actuating force to be applied for the aforementioned reasons. This makes the drive complex and expensive.

In addition, in vehicle cooling systems, check valves are sometimes used, which, in one flow direction, are self-expressed in by the coolant flow, whereas, in case of a coolant flow in an opposite flow direction, they are closed by the coolant flow. This is necessary, for example, when, after stopping an internal combustion engine, and with it the main water pump, a low coolant flow generated by small electrical auxiliary fluid pumps is to circulate through some branches of the cooling system, contrary to the prevailing direction of flow in operation. In modern cooling systems that have a so-called cold start shutdown, i.e. do not allow any coolant circulation during the heating phase of the internal combustion engine, special check valves are necessary. These are intended to be, for example, lockable by an electrical device in the closed position in order to completely prohibit the coolant circulation, but can be unlocked at a later time in order to perform their function as check valves. The provision of this check valve function is also costly with known drives.

In electric vehicles, magnetic valves are often used for locking battery cooling circuits, for example. This is because magnetic valves have a predetermined valve position due to the spring-exposed valve mechanism, typically the closed position, when not powered. In this way, in the event of a power failure, such as in an accident, the magnetic valve can still close the cooling circuit in order to prevent continued pumping of coolant to the battery or into a battery housing.

However, a requirement for electric vehicles is to consume as little power as possible in order to operate the corresponding components of the vehicle. Thus, current-actuatable valves, which only consume current when a valve is switched, are the preferred solution.

SUMMARY

The problem addressed by the present invention is to provide an alternative valve apparatus that is safe and reliable in operation.

A further problem addressed by the present invention is to provide a fail-safe valve apparatus, which also ensures a fail-safe protection in the event of an incident, for example in an accident and an associated power failure in a vehicle.

One or more of these problems are addressed by the features of independent Claim 1. Advantageous configurations are specified in the respective dependent subclaims.

According to the invention, a valve apparatus, in particular for a cooling system of a vehicle, is provided. Said apparatus comprises a housing having at least two fluid connectors, a valve device which can be adjusted at least between a first valve position and a second valve position, and a drive for adjusting the valve device between the first valve position and the second valve position.

The valve apparatus is characterized by a fail-safe adjustment device. Said device is provided in order to transfer the valve device from the first valve position (e.g. open position) to the second valve position (e.g. closed position) in the event of an incident in which the power supply, in particular that of the vehicle, is interrupted. Thus, the valve apparatus is configured in order to transfer a valve element (closure element, locking body) from one position into another position.

In this way, even in the event of an incident, for example after an accident, it is ensured that if the normal (on-board) power supply of a vehicle, in particular an electric or hybrid vehicle, is interrupted by one or more batteries, the valve device can still be closed. Thus, among other things, it can be safely and reliably prevented that, for example after an accident, coolant is pumped into a battery housing, because the valve device of the valve apparatus can be closed by means of the adjustment device.

An incident can be a state in which a power supply, in particular that of a vehicle, is interrupted and/or in which an invalid signal is present and/or in which an interference signal is present, and/or in which a corresponding switch signal for adjusting the valve device via the adjustment device is present.

Preferably, a sensor or detection device can be provided for detecting the incident.

The fail-safe adjustment device can comprise a fail-safe power source for deflecting or at least partially or completely transferring the valve device from the first [open position/valve position] in the direction of the second valve position.

The fail-safe power source preferably supplies electrical power to the drive such that it deflects the eccentric gear out of a neutral gear position in which the valve device is disposed in its first valve position about a predetermined angular range into a deflected gear position.

The fail-safe adjustment device can comprise a spring device for at least partially or completely transferring the valve device from the first, open valve position in the direction of the second valve position.

The fail-safe adjustment device can comprise an eccentric gear for at least partially or completely transferring the valve device from the first, open valve position in the direction of the second valve position.

The adjustment device or closure device can preferably comprise a fail-safe power source and/or an eccentric gear and/or a spring device, wherein the eccentric gear is coupled to the valve device and wherein the adjustment device or closure device is configured such that, when the valve device is disposed in the open position, the fail-safe power source supplies power to the drive such that it deflects the eccentric gear out of a neutral gear position at which the valve device of the first valve position (e.g. open position) is disposed about a predetermined angular range into a deflected gear position, wherein the spring device is coupled to the eccentric gear such that the eccentric gear in the deflected gear position is moved by means of (or at least regionally supported by) spring force of the spring device such that the valve device is disposed in the second valve position (e.g. closed position).

The fail-safe adjustment device combines the advantages of the efficiency of a DC current-actuatable ball valve with the mechanical fail-safety of a magnetic valve. The adjustment device is configured in order to transfer the valve device from the open position into the closed position in the event of an incident. An incident can exist, for example, after a motor vehicle has had an accident and the valve apparatus can no longer be operated with the DC voltage that otherwise supplies it. An incident can also be a simple failure of the power supply of the vehicle. The adjustment device therefore comprises the fail-safe power source, the eccentric disc with the eccentric pin, and the spring device. The eccentric disc is coupled to the valve device such that when the valve device is disposed in the open position, the fail-safe power source supplies power to the drive of the valve apparatus, such that it deflects the eccentric disc and the eccentric pin out of the open position about a predetermined angular range, wherein the spring device is coupled to the eccentric pin such that the eccentric pin is moved by means of spring force such that the valve device is disposed in the closed position.

Thus, even during an incident, the fail-safe adjustment device is able to transfer the valve device of the valve apparatus from the open position into the closed position, even when the otherwise available power supply is interrupted. Due to the provision of the corresponding spring device, the fail-safe power source must only provide a small amount of current or electrical energy for a short moment in order to deflect the eccentric pin about a predetermined angular range. The spring force of the spring device then assumes the transfer of the valve device from the first valve position (e.g. open position) into the second valve position (e.g. closed position).

The amount of electrical energy provided by the fail-safe power source depends upon the structural configuration of the valve apparatus. The larger the closure body and the larger the resistances (e.g. friction) and thus the torque required to actuate the closure body, the more electrical energy is required in order to deflect the eccentric pin.

The fail-safe power source can have a capacity of between about 2500 uF (microfarad) and about 7500 uF, or between about 3500 uF and about 6500 uF, or between about 4500 uF and about 5500 uF, and preferably about 5000 uF.

The energy stored in the system for transferring a locking body from a first valve position into a second valve position is thus preferably a combination of the spring force stored in the spring device (mechanical energy) and the current stored in the fail-safe power source (electrical energy).

The total stored energy (electrical and mechanical energy) contains at least about 3% and at most about 12%, or at least 7% and at most about 10%, of stored electrical energy. A proportion of stored mechanical energy is at least about 97% and at most about 88%, or at least 93% and at most about 90%.

The spring device can comprise a spring configured as a tension spring or a compression spring in order to retain or store the spring force.

A tension spring provides a linear straight-line tensile force that is nearly fail-safe and therefore preferred. The provision of a compression spring is also possible. With a suitable guide device, any possible blocking of the compression spring can be prevented.

The eccentric gear can comprise an eccentric disc and an eccentric pin.

The predetermined angular range can be at least 1° or 2° or 3° or 5° or 7.5° or 10° and at most 30° or 25° or 20° and preferably about 15°.

In order to deflect the eccentric pin about such a predetermined angular range, only a small amount of current is necessary.

The eccentric gear can be moved along a circular path by means of the drive when the valve direction is adjusted between the open position and the closed position, wherein the eccentric pin, and with it the valve device, is disposed in a lowest position of 180° in the open position and in a highest position of 360° in the open position.

The highest position of the eccentric pin of 360°, in which the valve device is disposed in the closed position, is a position in which the eccentric pin has the greatest distance from the spring device in a spring direction.

The open position of the valve device, in which the eccentric pin is disposed in a lowest position of 180°, is the position in which the eccentric pin has the smallest distance from the spring device in a spring direction.

A spring direction is understood to mean a direction in which the spring device applies a spring force to the eccentric pin.

The eccentric pin can be coupled to the spring device such that, when the valve apparatus is transferred from the closed position into the open position, the spring device is pretensioned.

In this way, during normal operation of the valve apparatus, the necessary mechanical energy is stored in order to transfer the spring device from the open position into the closed position in the event of an incident.

The drive can be coupled to the valve device via a gear, particularly via the eccentric gear or another gear, preferably a multi-stage gear train, wherein one level of this gear is formed by the eccentric disc and is referred to as the eccentric gear.

The eccentric gear has a section that is free of teeth, so that less spring force is required when the valve device is transferred from the second valve position into the first valve position.

The spring device can be coupled to the eccentric pin via an actuating element for actuating said eccentric pin.

Due to the provision of the actuating element, the force flow of the pretensioned spring elements of the spring device can be optimally transferred to the eccentric pin in the spring direction.

The actuating element can be slidably mounted in a linear guide in a linear manner.

In this way, an efficient transfer of the spring force from the spring device to the eccentric pin is possible.

An electric motor can preferably be provided as a drive, which preferably drives the valve device indirectly via the gear. For example, in a particularly inexpensive manner, the electric motor is a DC current motor.

The fail-safe power source can be a battery, an accumulator, or preferably a capacitor.

The fail-safe power source provides sufficient power in order to deflect the eccentric pin about a predetermined angular range in the event of an incident.

The valve device can be a ball valve element, wherein a ball having a passageway forms a locking body of the ball valve element.

Furthermore, a sensor and preferably a plurality of sensors, in particular Hall sensors, can be provided in order to detect a valve position of the valve device, wherein at least one further sensor can be provided for detecting an incident, and wherein a control device can be provided for actuating the valve apparatus and the adjustment device, which actuates the components of the valve apparatus on the basis of the data acquired by the sensors.

According to an alternative embodiment, the adjustment device can comprise a fail-safe power source whose amount of electrical energy alone is sufficient to transfer the valve device of the valve apparatus from the open position into the closed position.

With the valve apparatus according to the invention, the efficiency with regard to the current demand of a current-operated valve, in particular a ball valve, and the mechanical reliability of a magnetic valve are combined for the first time.

Furthermore, according to the present invention, a fail-safe or redundant method for closing or locking the valve apparatus is provided. This method can be carried out by the sensors discussed above in connection with the control device.

In the valve apparatus according to the invention, it is provided that, when the supply voltage is no longer available and the valve device is disposed in a first position, e.g. the open position (or the closed position), a failure assistance mode is activated and the adjustment device intervenes.

It is provided here that the fail-safe power source provides power to the motor, whereby a drive shaft of the motor is preferably moved counter-clockwise.

In the valve apparatus, the eccentric pin is located in a lowest operating position in the open position. The rotational movement of the drive shaft of the motor causes the eccentric disc to move counter-clockwise.

After a rotational movement about a predetermined angular range, preferably of 15°, the eccentric gear and the second gear are separated from one another. By means of the spring force of the spring device, the eccentric disc and the associated valve device are exposed to the spring force of the spring device and are preferably moved by approximately 303 degrees. The interface between the fluid connectors is disconnected such that the second valve position, e.g. the closed position (or the open position), is present.

When supply voltage is again available, for example in a vehicle, it is detected by means of corresponding sensors, for example by means of Hall sensors, that there is no longer a fail-safe signal, because the valve device is disposed either in the normal open position or in the normal closed position.

The drive is then actuated such that it rotates slowly, preferably clockwise, in order to ensure that the gears of the second gear and the eccentric gear are not stuck.

The remaining spring force of the springs of the spring device, which are not yet fully expanded, ensures that the eccentric gear and the second gear reengage with one another. The eccentric gear then moves clockwise until the highest position of the eccentric pin is detected.

The valve is then back in normal operation mode.

The normal position of the valve device is the closed position. The eccentric pin on the eccentric gear is in the highest position.

As soon as the valve apparatus receives the signal to switch from the closed position into the open position, the drive shaft of the motor rotates preferably counter-clockwise. The eccentric gear then moves clockwise.

With the assistance of a magnet and a corresponding Hall sensor, the lowest position of the eccentric pin can be detected, and the rotational movement is stopped. During this movement, the eccentric pin pushes the actuating element and the spring device connected thereto downward against the spring direction and pre-tensions the spring(s) of the spring device.

The valve apparatus is now in the open position. When the valve apparatus receives the signal to dispose the valve element in the closed position, the drive shaft of the motor rotates preferably clockwise. The eccentric gear then rotates counter-clockwise.

With a further Hall sensor, the highest position of the eccentric pin can be detected.

The valve apparatus is again in the normal closed position.

The valve apparatus can be adjustable, for example, between an open position that releases an interface between the fluid connectors, in particular between the coolant connectors, and a closed position that separates the interface between the fluid connectors. The first or second valve position can thus be an open or a closed valve position, depending on the need and use of the fail-safe valve device.

In the context of the present invention, a valve apparatus can be a component for locking or controlling the flow of fluids (liquids or gases) such as a corner valve, a through-way valve, or a directional control valve, which can be configured as (electric) motor-operated valves with or without a valve drive.

With the valve device, a fluid can thus be impeded while flowing in both directions (flow valves), or, depending on the direction of flow (check valves), the fluid can be impeded by the pressure (pressure valves), or the flow can be controlled simultaneously on multiple conduits (directional valves, 3/2 or higher).

The valve apparatus can [be] a lock valve or flow valve, such as a throttle valve, a retarding valve, a change valve (OR element), a two-pressure valve (AND element), a quick-release valve, a through-way valve, a flow switch valve, a 2/2-way valve, or a check valve (throttle check valve, quick-vent valve, KFR [combined freeflow valve with integrated backflow preventer]) or a pressure valve (pressure limiting valve and sequence valve, pressure balance (differential pressure valve), pressure reducing valve, pressure control valve) or a directional control valve (three-way valves, four-way valves, or higher order directional valves).

As closure types, a distinction must be made between seat valves and spool valves. The sealing body moves either in the axis of flow or perpendicular thereto, i.e. towards the sealing surface (seat) or along it (spool). The valve apparatus can be configured as a poppet valve (seat valve), pipe valve, or a double seat valve (seat valve), plunger valve (spool valve), roller diaphragm valve, pinch valve, needle valve (seat valve), and preferably as a ball valve (optionally seat or spool valve).

BRIEF DESCRIPTION OF THE DRAWINGS

The present invention will be described below on the basis of an embodiment shown in the figures. The figures show.

DETAILED DESCRIPTION

A valve apparatus 1 according to the invention for a cooling system is described below on the basis of an embodiment (FIGS. 1 to 16).

The valve apparatus 1 comprises a housing 2 with at least two fluid connectors 3, 4 that are configured as coolant connectors in the present embodiment.

A valve device 5 is disposed in the housing 1. The valve device 5 is a ball valve element, wherein a ball 6 with a passageway 7 forms a locking body of the ball valve element.

According to the present embodiment, the ball 6 or the locking body with the passageway 7 is adjustable between an open position 8, which releases an interface between the fluid connectors 3, 4 and constitutes a first valve position, and a closed position 9, which separates the interface between the fluid connectors and constitutes a second valve position.

Furthermore, a drive 10 for adjusting the valve device 5 between the open position 8 and the closed position 9 is provided. The drive 10 is configured as an electric motor.

The drive is connected to a fail-safe power source (not shown) and can be a battery, an accumulator, or preferably a capacitor. The fail-safe power source provides sufficient power in order to deflect the eccentric pin about a predetermined angular range in the event of an incident.

A drive shaft 11 of the drive 10 is connected to a drive gear 12. The drive gear 12 is connected to an eccentric disc 20 having a toothing 19 via a first gear device 13 having two gears 14, 15 and a second gear device 16 having two gears 17, 18. This toothing forms an eccentric gear.

The eccentric disc 20 also has a tooth-free section 33, so that a lower spring force is necessary when transferring the valve device from the closed position 9 into the open position 8.

The toothing 19 of the eccentric disc 20 extends approximately over an angular range of the eccentric disc 20 from about 180° to 270°. The remaining angular range forms the tooth-free section 33.

The eccentric disc 20 is also referred to below as the eccentric gear. The toothing 19 of the eccentric disc 20 is coupled to the gear 18 of the second gear device 16.

Furthermore, the eccentric disc 20 is connected to the ball 6 of the valve device 5 via a valve shaft 21 and a corresponding securing and storage device 22.

An eccentric pin 23 is integrally formed on a side of the eccentric disc 20 facing away from the ball device 5. The eccentric pin 23 is formed as a rod having a round cross-section that extends orthogonally outward from an end wall of the eccentric disc 20.

The eccentric disc 20 and the eccentric pin 23 are part of a fail-safe adjustment device 24, which in the present embodiment is a closure device 24.

The adjustment device 24 also comprises a spring device 25.

In the present embodiment, the spring device 25 has two springs 26. The springs extend approximately parallel to the end face of the eccentric disc 20 in a spring direction 32.

In the present embodiment, the spring device 25 is formed by two compression springs. Alternatively, one or more tension springs can also be provided in order to form the spring device.

Furthermore, the springs 26 are disposed on corresponding prongs 27 of a spring seat 28. The spring seat 28 also has a linear guide 29. The linear guide 29 comprises two guide rails 30, which extend approximately parallel to the end wall of the eccentric disc 20.

The guide rails 30 are configured in order to guide an actuating element 31 in and against a spring direction 32.

The springs 26 are disposed on the prongs 27 of the spring seat 28 of the spring device 25 and are coupled to the actuating element 31, which is linearly guided in the guide rails 30.

Furthermore, a sensor and preferably a plurality of sensors (not shown), in particular Hall sensors, are provided for detecting a valve position of the valve device.

Furthermore, at least one further sensor or a detection device (not shown) is provided for detecting an incident.

In addition, a control device (not shown) for driving the valve apparatus and the adjustment device is provided, said control device driving the components of the valve apparatus on the basis of the data recorded by the sensors.

Figure 1:
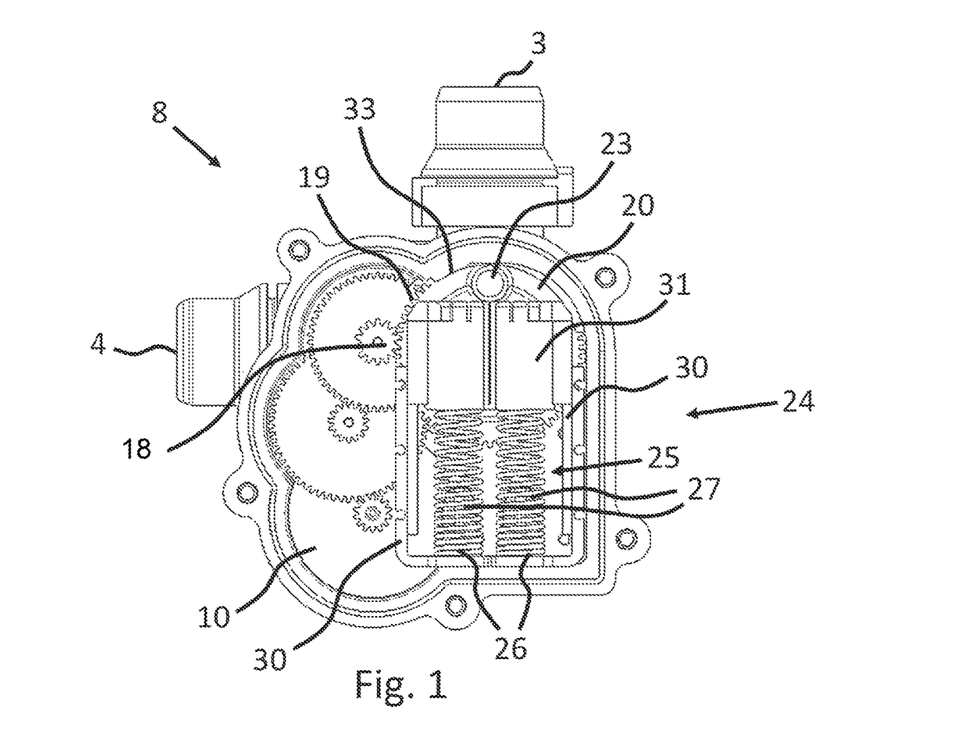
FIG. 1 shows a valve apparatus according to the invention with an opened housing in a perspective view in a closed position, in which an eccentric pin is disposed in a 0 degree or 360 degree position.
Figure 2:
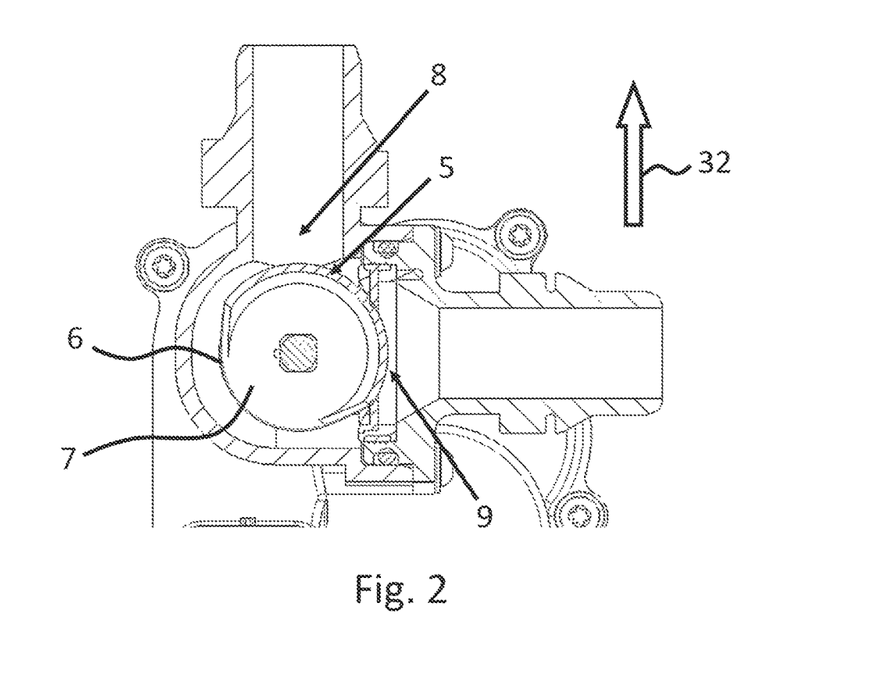
FIG. 2 shows a further opened view of the valve apparatus in the closed position.
Figure 3:
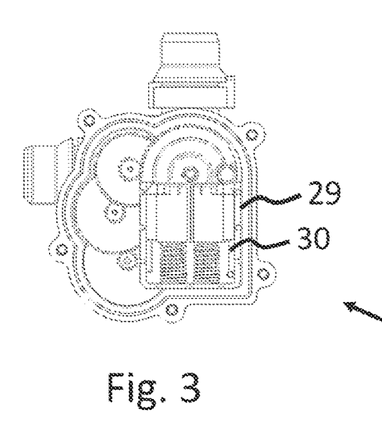
FIG. 3 shows a side view of the valve apparatus with opened housing in which the eccentric pin is disposed in a 90 degree position.
Figure 4:
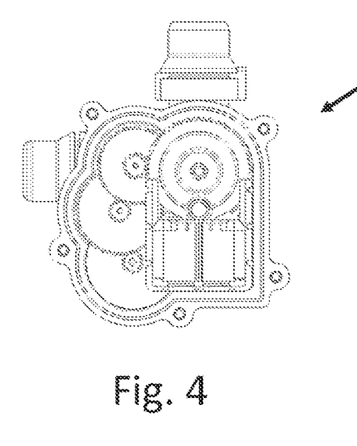
FIG. 4 shows a further side view of the valve apparatus with opened housing in which the eccentric pin is disposed in a 180 degree position and the valve device is in the open position.
Figure 5:
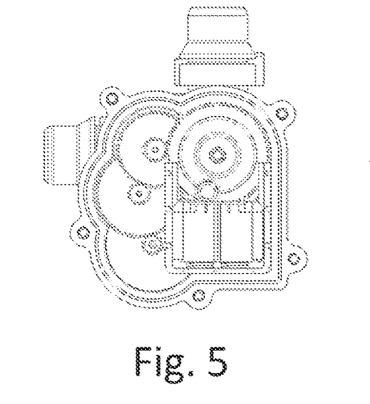
FIG. 5 shows a further side view of the valve apparatus with opened housing, in which the eccentric pin has been deflected out of the closed position by 15 degrees, because a fail-safe signal was detected, in which the eccentric pin is now disposed in a 195 degree position.
Figure 6:
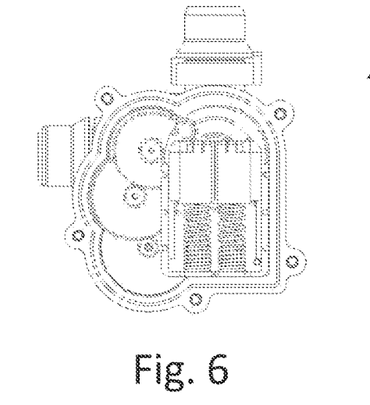
FIG. 6 shows a side view of the valve apparatus with opened housing in which the valve device is almost closed by the adjustment device and in which the eccentric pin is disposed in a 303 degree position.
Figure 7:
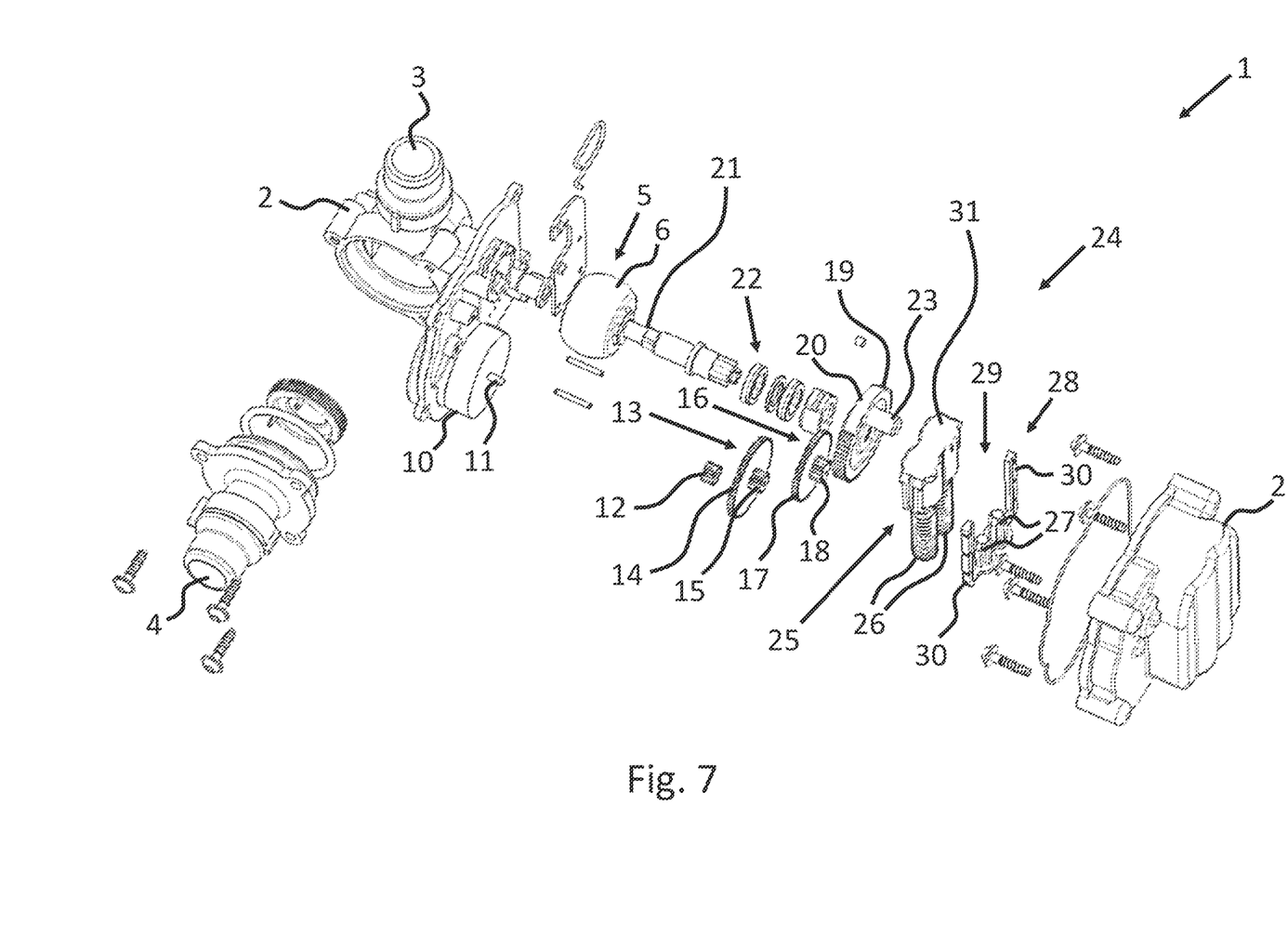
FIG. 7 shows an exploded view of the valve apparatus according to the invention.
Figure 8:
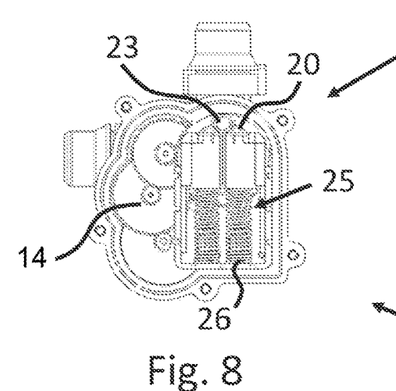
FIGS. 8 to 16 show further views of the valve apparatus according to the invention in different operating states.
Figure 9:
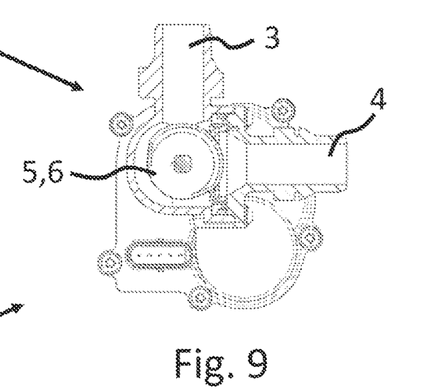
Figure 10:
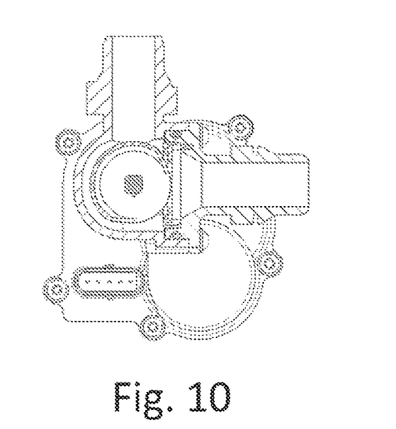
Figure 11:
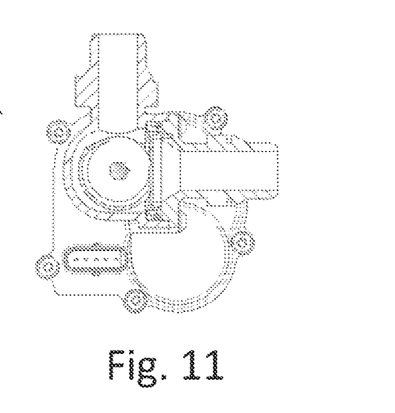
Figure 12:
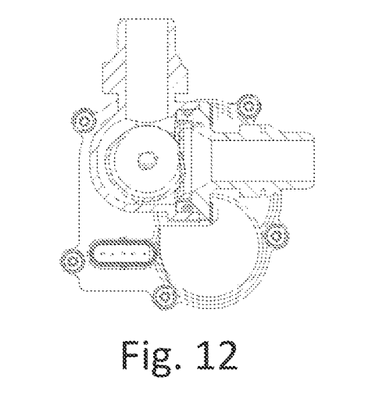
Figure 13:
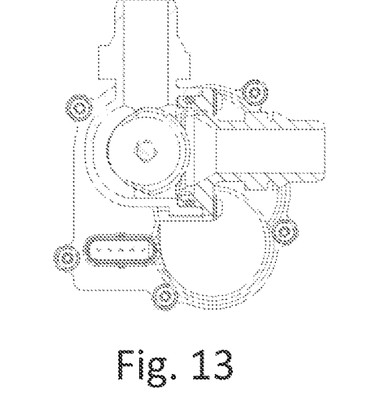
Figure 14:
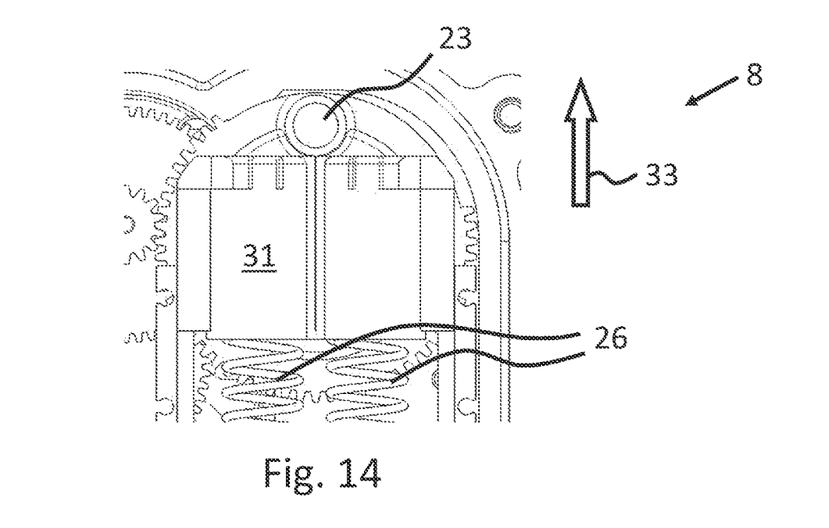
Figure 15:
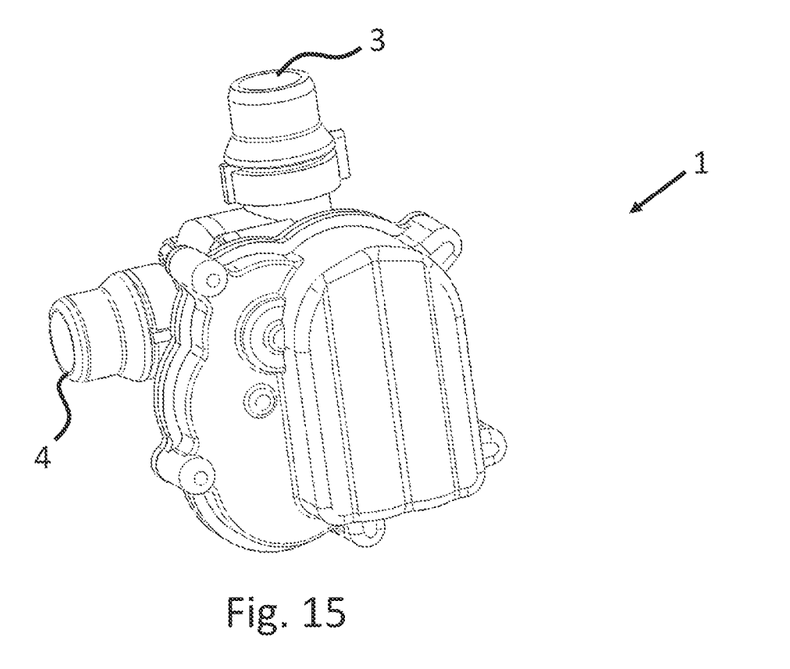
Figure 16:
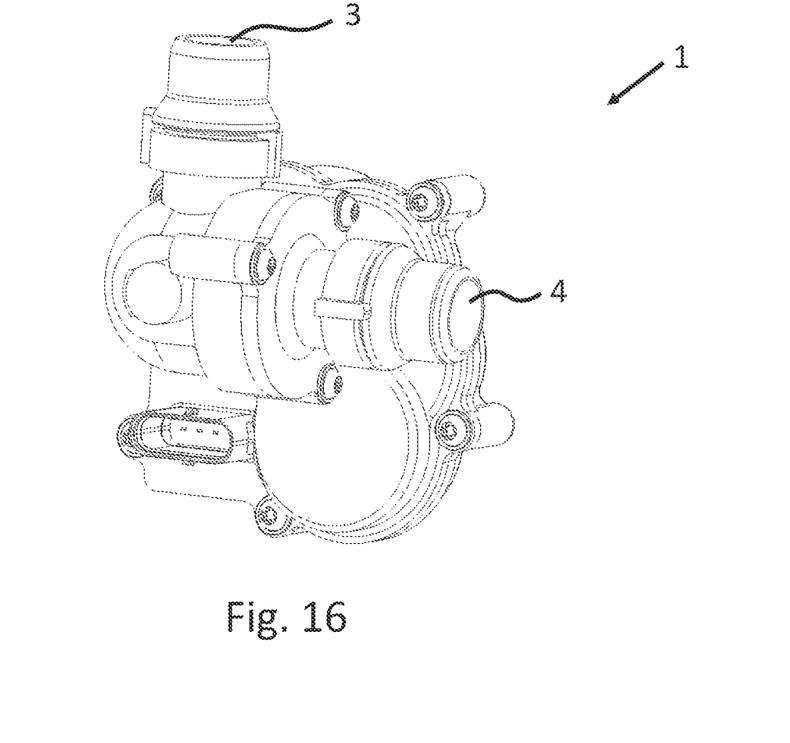
Figure 17:
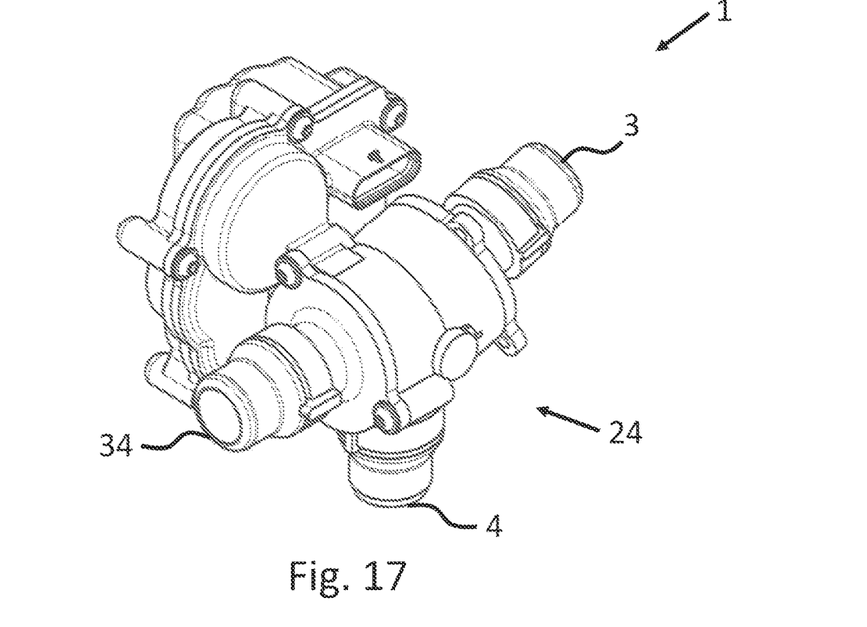
FIG. 17 shows a perspective view of a valve apparatus with the switchover function.
Figure 18:
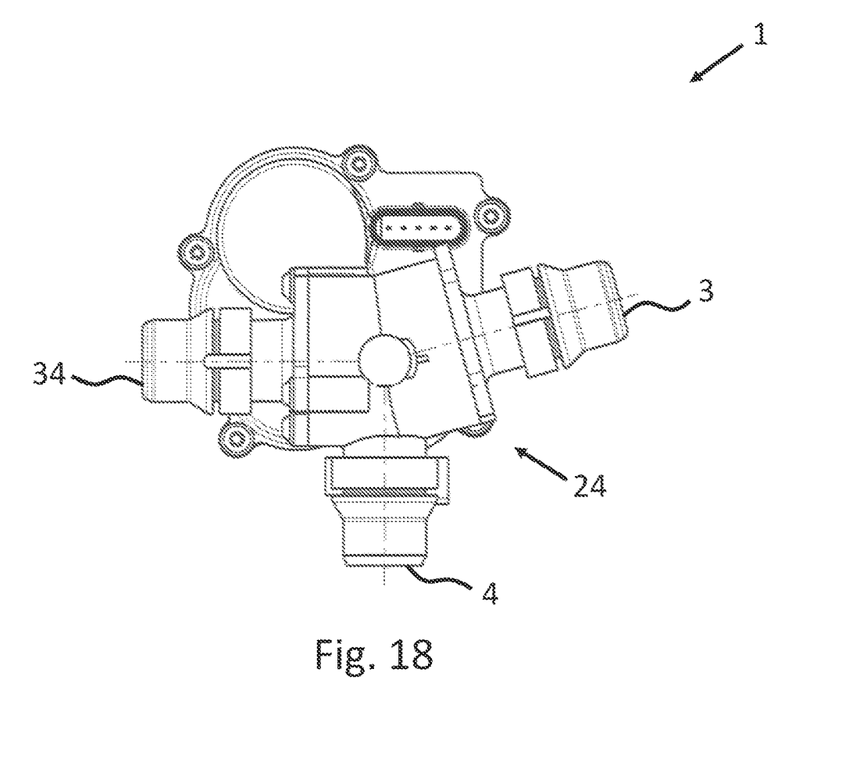
FIG. 18 shows a side view of the valve apparatus from FIG. 17.

According to a further embodiment, a valve apparatus 1 with a switchover function is provided (FIGS. 17 and 18). This valve apparatus has the same technical features as the valve apparatus described above.

The valve apparatus 1 with the switchover function has three fluid connectors 3, 4 and serves to demonstrate that the fail-safe adjustment device is suitable for a variety of the types of valves described above.

According to an alternative embodiment (not shown), the adjustment device comprises a fail-safe power source whose amount of electrical energy alone is sufficient in order to transfer the valve device of the valve apparatus from the open position into the closed position.

Furthermore, according to the present invention, a fail-safe or redundant method for closing or locking the valve apparatus 1 is provided. This method is carried out by the sensors discussed above in connection with the control device, which actuates the drive 10 and with it the adjustment device 24.

In the valve apparatus 1 according to the invention, it is provided that, when a supply voltage is no longer available and the valve device 1 is disposed, for example, in the open position 8 (first position), a failure assistance mode is activated, and the adjustment device intervenes.

It is provided that the fail-safe power source provides power to the drive 10 or electric motor, whereby a drive shaft 11 of the motor 10 is moved preferably counter-clockwise. However, the direction of rotation can be freely selected depending on the design of the valve apparatus.

In the valve apparatus 1, the eccentric pin 23 is at a lowest operating position in the first position, for example the open position 8. As a result of the rotational movement of the drive shaft 11 of the motor 10 and the corresponding gear stages, the eccentric disc 20 moves counter-clockwise.

After a rotational movement about a predetermined angular range of about 15°, the eccentric gear and the second gear are separated from one another. By means of the spring force of the spring device 25, the eccentric disc 20 and the valve device 5 connected thereto are exposed to the spring force of the spring device 25 and moved by approximately 303 degrees. The interface between the fluid connectors 3, 4 is disconnected such that the second valve position, for example a closed position, is present.

When supply voltage is again available, for example in a vehicle, it is detected by means of at least one Hall sensor that there is no longer a fail-safe signal, because the valve device 5 is disposed either in the first valve position, for example a normal open position, or in the second valve position, for example a normal closed position.

The motor 10 is then actuated to rotate slowly, preferably clockwise, in order to ensure that the gears of the second gear and the eccentric gear are not stuck.

The remaining spring force from the not yet fully expanded springs of the spring device 25 ensure that the eccentric gear and the second gear reengage with one another. The eccentric gear then moves clockwise until the highest position of the eccentric pin is detected.

The valve is then back in normal operation mode.

The normal position of the valve apparatus 1 is, for example, the closed position. The eccentric pin 23 on the eccentric gear is in the highest position. Alternatively, depending on the use of the valve apparatus 1, it can also be provided that the normal position of the valve apparatus 1 is, for example, the open position. The eccentric pin 23 on the eccentric gear is then still in the highest position in order to ensure a fail-safety.

As soon as the valve apparatus receives the signal to switch from the closed position into the open position (or vice versa), the drive shaft 11 of the motor 10 rotates preferably counter-clockwise. The eccentric gear then accordingly moves clockwise.

With the assistance of a magnet and a corresponding Hall sensor, the lowest position of the eccentric pin 23 can be detected, and the rotational movement is stopped. During this movement, the eccentric pin 23 pushes the actuating element 31 and the spring device 25 connected thereto downward against the spring direction and pre-tensions the spring(s) of the spring device.

The valve apparatus 1 is now in the open position. When the valve apparatus receives the signal to dispose the valve element in the closed position, the drive shaft of the motor rotates preferably clockwise. The eccentric gear then rotates counter-clockwise.

With a further Hall sensor, the highest position of the eccentric pin can be detected.

The valve apparatus is again in the normal closed position.

LIST OF REFERENCE NUMERALS

1 Valve apparatus
2 Housing
3 Fluid connector
4 Fluid connector
5 Valve device
6 Ball
7 Passageway
8 Open position
9 Closed position
10 Drive
11 Drive shaft
12 Drive gear
13 First gear device
14 Gear
15 Gear
16 Second gear device
17 Gear
18 Gear
19 Toothing
20 Eccentric disc
21 Valve shaft
22 Securing and storage device
23 Eccentric pin
24 Adjustment device
25 Spring device
26 Spring
27 Prong
28 Spring seat
29 Linear guide
30 Guide rail
31 Actuating element
32 Spring direction
33 Tooth-free section
34 Fluid connector

The invention claimed is:

1. A rotary valve apparatus, comprising
a housing having at least two fluid connectors,
a valve device rotatable at least between a first valve position and a second valve position, and
a drive for rotating the valve device between the first valve position and the second valve position,
wherein a fail-safe adjustment device is provided in order to rotate the valve device from the first valve position into the second valve position in the event of an incident;
wherein the fail-safe adjustment device comprises a fail-safe electrical power source for powering the drive to at least partially rotate the valve device from the first valve position to the second valve position.

2. The rotary valve apparatus according to claim 1, wherein
an incident is a condition
in which a power supply is interrupted, and/or
in which there is an invalid signal, and/or
in which there is an interference signal, and/or there is a switch signal to adjust the valve device by means of the adjustment device.

3. The rotary valve apparatus according to claim 1, wherein
the fail-safe adjustment device further comprises an axial spring device for at least partially rotating the valve device from the first valve position to the second valve position.

4. The rotary valve apparatus according to claim 3, wherein
the fail-safe adjustment device further comprises an eccentric gear for at least partially rotating the valve device from the first valve position to the second valve position.

5. The rotary valve apparatus according to claim 4, wherein
the first valve position is an open position, wherein the eccentric gear is coupled to the valve device and wherein the adjustment device is configured such that, when the valve device is disposed in the open position, the fail-safe power source supplies power to the drive such that the drive deflects the eccentric gear out of a neutral gear position, in which the valve device is disposed in the open position, about a predetermined angular range into a deflected gear position, wherein the spring device is coupled to the eccentric gear such that the eccentric gear in the deflected gear position is moved by a spring force of the spring device such that the valve device is disposed in the second valve position.

6. The rotary valve apparatus according to claim 4, wherein
the first valve position is an open position,
the second valve position is a closed position,
the eccentric gear comprises an eccentric disc and an eccentric pin, wherein the eccentric pin is moved along a circular path by the drive when the valve device is adjusted between the open position and the closed position, and wherein the eccentric pin, and with it the valve device, is disposed in a lowest position, in a spring direction, of 180° in the first valve position and in a highest position, in the spring direction, of 360° in the second valve position.

7. The rotary valve apparatus according to claim 6, wherein
the eccentric pin is coupled to the axial spring device such that, when the valve device is rotated from the second valve position into the first valve position, the axial spring device is pretensioned in order to be able to retain the spring force.

8. The rotary valve apparatus according to claim 7, wherein
the eccentric gear has a section that is free of teeth, so that less spring force is required when the valve device is rotated from the second valve position into the first valve position.

9. The rotary valve apparatus of claim 1, wherein the fail-safe adjustment device further comprises an eccentric gear for at least partially rotating the valve device from the first valve position to the second valve position and a spring device associated with the eccentric gear, wherein the eccentric gear is configured such that, during operation of the fail-safe adjustment device, the eccentric gear is initially rotated by a further gear, which is geared for rotation by the drive, to rotate the valve device toward the second valve position, and the eccentric gear then separates from the further gear such that the spring device subsequently rotates the eccentric gear to rotate the valve device toward the second valve position.

10. A rotary valve apparatus, comprising
a housing having at least two fluid connectors,
a valve device rotatable at least between a first valve position and a second valve position, and
a drive for rotating the valve device between the first valve position and the second valve position,
a fail-safe adjustment device for rotating the valve device from the first valve position into the second valve position in the event of an incident;
wherein the fail-safe adjustment device comprises a first gear driven by a second gear, the second gear is geared for rotation by the drive, wherein the first gear is configured such that, during operation of the fail-safe adjustment device, the first gear is initially rotated by the second gear to rotate the valve device toward the second valve position, and the first gear then separates from the second gear.

11. The rotary valve apparatus of claim 10, wherein the first gear carries an eccentric pin, wherein the fail-safe adjustment device further includes a spring device that interacts with the eccentric pin.

12. The rotary valve apparatus of claim 11, wherein, when the first gear separates from the second gear, the spring device subsequently interacts with the eccentric pin to rotate the first gear to rotate the valve device toward the second valve position.

13. The rotary valve apparatus of claim 12, wherein the spring device comprises at least one axial spring that applies force to linearly move an actuating element that interacts with the eccentric pin to rotate the first gear.

14. A valve apparatus, comprising
a housing having at least two fluid connectors,
a valve device adjustable at least between a first valve position and a second valve position, and
a drive for adjusting the valve device between the first valve position and the second valve position,
a fail-safe adjustment device having an eccentric element that is rotatable in order to adjust the valve device from the first valve position into the second valve position in the event of an incident;
wherein the fail-safe adjustment device comprises a fail-safe electric power source for powering the drive to rotate of the eccentric element in a direction to adjust the valve device toward the second valve position, and an axial spring device that interacts with the eccentric element to translate linear movement of the axial spring device into rotary movement of the eccentric element so as to adjust the valve device.

15. The valve apparatus of claim 14, wherein the eccentric element comprises an eccentric pin on a first gear which is coupled to the valve device.

16. The valve apparatus of claim 15, wherein the first gear is geared for rotation by the drive.

17. The valve apparatus of claim 15, wherein, in the first valve position, the first gear is positioned such that the eccentric pin is in a neutral position in which the eccentric pin and an axis of rotation of the first gear are aligned along a linear movement direction of the axial spring device.

* * * * *